(12) United States Patent
Wu et al.

(10) Patent No.: US 7,196,449 B2
(45) Date of Patent: Mar. 27, 2007

(54) TWO-AXIS DEVICE AND MANUFACTURING METHOD THEREFOR

(75) Inventors: Mingching Wu, Yingge Township, Taipei County (TW); Hsueh-An Yang, Taipei (TW); Hung-Yi Lin, Lujhu Township, Taoyuan County (TW); Weileun Fang, Hsinchu (TW)

(73) Assignee: Walsin Lihwa Corp., Taipei (TW)

( * ) Notice: Subject to any disclaimer, the term of this patent is extended or adjusted under 35 U.S.C. 154(b) by 295 days.

(21) Appl. No.: 10/951,529

(22) Filed: Sep. 28, 2004

(65) Prior Publication Data

US 2005/0280331 A1    Dec. 22, 2005

(30) Foreign Application Priority Data

Jun. 18, 2004  (TW)  .............................. 93117784 A

(51) Int. Cl.
*H02N 1/00*   (2006.01)
*C23F 1/00*   (2006.01)

(52) U.S. Cl. ............................. 310/309; 359/225; 216/2

(58) Field of Classification Search ................. 310/309
See application file for complete search history.

(56) References Cited

U.S. PATENT DOCUMENTS

| | | | | |
|---|---|---|---|---|
| 5,629,790 A | * | 5/1997 | Neukermans et al. ....... | 359/198 |
| 5,834,864 A | * | 11/1998 | Hesterman et al. ... | 310/40 MM |
| 6,044,705 A | * | 4/2000 | Neukermans et al. .... | 73/504.02 |
| 6,232,861 B1 | * | 5/2001 | Asada ......................... | 335/222 |
| 6,295,154 B1 | * | 9/2001 | Laor et al. ................... | 359/223 |
| 6,392,220 B1 | * | 5/2002 | Slater et al. ................ | 250/216 |
| 6,563,106 B1 | * | 5/2003 | Bowers et al. .............. | 250/216 |
| 6,594,059 B2 | * | 7/2003 | Flanders ..................... | 359/230 |
| 6,774,445 B2 | * | 8/2004 | Mutoh et al. ............... | 257/415 |
| 6,775,043 B1 | * | 8/2004 | Leung et al. ............... | 359/224 |
| 6,912,078 B2 | * | 6/2005 | Kudrle et al. ............... | 359/224 |
| 6,989,921 B2 | * | 1/2006 | Bernstein et al. ........... | 359/290 |
| 7,031,040 B2 | * | 4/2006 | Fujii et al. .................. | 359/224 |
| 7,088,494 B2 | * | 8/2006 | Mizuno ...................... | 359/291 |
| 2002/0149294 A1 | * | 10/2002 | Matsumoto et al. ........ | 310/309 |
| 2005/0088720 A1 | * | 4/2005 | Ko et al. ..................... | 359/291 |

* cited by examiner

*Primary Examiner*—Burton Mullins
(74) *Attorney, Agent, or Firm*—Volpe and Koenig, P.C.

(57) ABSTRACT

A two-axis device is provided. The two-axis device includes a first substrate having a plurality of electrodes, a first connecting layer located on the first substrate, an actuating layer, a second connecting layer and a cover. The actuating layer is connected to the first substrate via the first connecting layer and includes a circular portion, an actuating portion, a first shaft and a second shaft. The second connecting layer is connected to the actuating layer and the cover is connected to the actuating layer via the second connecting layer. In addition, a vacuum concavity is formed by the first substrate, the first connecting layer, the actuating layer, the second connecting layer and the cover. The actuating portion and the first shaft are located in the vacuum concavity, and the second shaft extends outside of the vacuum concavity.

23 Claims, 5 Drawing Sheets

TWO-AXIS DEVICE AND MANUFACTURING METHOD THEREFOR

FIELD OF THE INVENTION

The present invention relates a micro device and a manufacturing method therefor, and more particular to a two-axis device and the manufacturing method therefor.

BACKGROUND OF THE INVENTION

The two-axis device has been widely applied in various fields, such as the bar code reader, laser printer, display, and optical switch. Since the two shafts of the prior two-axis device are located in similar situations, such as in the situations with similar damping, the relevant sensitivities and precisions thereof are limited accordingly. For instances, as to a two-axis mirror applied in the display, the first shaft of the two-axis mirror is used for proceeding a line scanning with a high frequency to the object. The higher the scanning frequency and the scanning angle are, the greater the obtained precision and the resolution are. In which, the scanning angle is determined by the quality factor of the two-axis mirror. If the two-axis mirror has a higher quality factor, the relevant scanning angle thereof would be higher. Furthermore, since the quality factor of the two-axis mirror is determined by the air damping in the surrounding environment, wherein the higher the air damping is, the lower the quality factor is, the quality factor and the relevant scanning angle of the two-axis mirror would be effectively increased by reducing the air damping. In other words, if the first shaft of the two-axis mirror is located in a vacuum situation, the relevant resolution thereof would be improved effectively. In addition, the second shaft of the two-axis mirror is perpendicular to the first shaft thereof and is used for performing a slow scanning with low frequency for expanding the scanning result obtained from the line scanning of the first shaft into a two-dimensional surface scanning. Since a precise angle control is essential for the scanning of the second shaft and proper air damping would be helpful to improve the precision of the angle control for the second shaft, the second shaft would be located in the atmosphere. On the contrary, if the second shaft is in the situation with less air damping as that for the first shaft, it would be more difficult to perform the angle control for the second shaft and an image with a low resolution would be obtained. Accordingly, the obtained resolution would be not so well.

As the above, since the air damping is a determinant for the scanning resolution of the two-axis mirror, wherein one of the two shafts thereof should be located in a situation with low air damping (high quality factor), and the other shaft thereof should be located in a situation with some air damping (relatively low quality factor), the relevant precision and resolution of the two-axis mirror would be effectively improved by properly controlling the air amounts of the situations where the first and the second shafts are performed in. Further speaking, it is ponderable to provide a method for manufacturing a two-axis device with two shafts respectively located in the situations with different air dampings.

SUMMARY OF THE INVENTION

In accordance with an aspect of the present invention, a two-axis device is provided. The two-axis device includes a first substrate having a plurality of electrodes, a first connecting layer located on the first substrate, an actuating layer connected to the first substrate via the first connecting layer, a second connecting layer and a cover. The actuating layer includes a circular portion, an actuating portion, a first shaft and a second shaft, the second connecting layer is connected to the actuating layer, and the cover is connected to the actuating layer via the second connecting layer. In which, a vacuum concavity is formed by the first substrate, the first connecting layer, the actuating layer, the second connecting layer and the cover, the actuating portion and the first shaft are located in the vacuum concavity, and the second shaft extends outside of the vacuum concavity.

Preferably, the plurality of electrodes include a positive electrode and a negative electrode.

Preferably, the plurality of electrodes are ones of metal electrodes and polysilicon electrodes.

Preferably, the first substrate and the cover are made of an insulating material.

Preferably, the actuating layer is made of one of a silicon and a combination thereof.

Preferably, the cover is a transparent cover.

Preferably, the first connecting layer includes one of a first metal layer and a first electromagnetic induction layer.

Preferably, the second connecting layer includes one of a second metal layer and a second electromagnetic induction layer.

In accordance with another aspect of the present invention, a two-axis device is provided. The two-axis device includes a vacuum concavity formed by plural substrates, a supporting portion and at least a connecting layer, and an actuating portion located in the vacuum concavity, including the supporting portion, an actuating component, a first shaft and a second shaft. The first shaft and the second shaft are axes of the actuating component, the first shaft is contained in the vacuum concavity, and the second shaft extends outside of the vacuum concavity.

Preferably, one of the plural substrates includes plural electrodes.

Preferably, the plural substrates are insulating substrates.

Preferably, the connecting layer includes one of a metal layer and an electromagnetic induction layer.

In accordance with another aspect of the present invention, a resonance device is provided. The resonance device includes an actuating component and a two-axis component. The two-axis component includes a vacuum concavity formed by plural substrates and at least a connecting layer and a two-axis actuating component located in the vacuum concavity and including a first shaft and a second shaft. The first shaft is contained in the vacuum concavity, and the second shaft extends outside of the vacuum concavity.

In accordance with another aspect of the present invention, a method for manufacturing a two-axis device is provided, wherein the two-axis device has a first shaft and a second shaft. The method includes steps of a) providing a first substrate and a second substrate, b) forming plural electrodes on the first substrate, c) forming a first connecting layer on the first substrate, d) etching the first substrate to form a first base, e) patterning the second substrate to form a second base and an actuating structure including the two-axis device, f) forming a second connecting layer on the second substrate, g) connecting a cover onto the second connecting layer for covering the second substrate, h) removing the second base, i) connecting the first connecting layer to the actuating structure in a vacuum, wherein the first shaft is contained in a vacuum concavity and the second shaft extends outside of said vacuum concavity, and j) removing the first base.

Preferably, the first substrate and the second substrate are silicon on insulator (SOI) chips.

Preferably, the plural electrodes are ones of metal electrodes and polysilicon electrodes.

Preferably, the steps d), e), h) and j) are performed by etching.

Preferably, the cover is made of a transparent insulating substrate.

In accordance with another aspect of the present invention, a method for manufacturing a microsystem device is provided. The method includes steps of a) providing plural substrates, b) etching the plural substrates to form an upper substrate, a lower substrate, and a two-axis device having a first shaft and a second shaft, and c) connecting the plural substrates to the two-axis device to form the microsystem device. The microsystem device includes a vacuum concavity, the two-axis device and the first shaft are located in the vacuum concavity, and the second shaft extends outside of the vacuum concavity.

Preferably, the plural substrates have a silicon on insulator (SOI) chip.

Preferably, the plural substrates have a transparent substrate.

Preferably, the step c) is performed via a connecting material.

Preferably, the connecting material is one of a metal and a polymer.

The above contents and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Furthermore, although the preferred embodiment disclosed herein is about the manufacturing process of the two-axis mirror, it should be noted that it would be easy for one skilled in the art to apply the relevant concepts and disclosures of the present invention into the manufacturing processes for other two-axis devices and resonance device.

Figure 1:
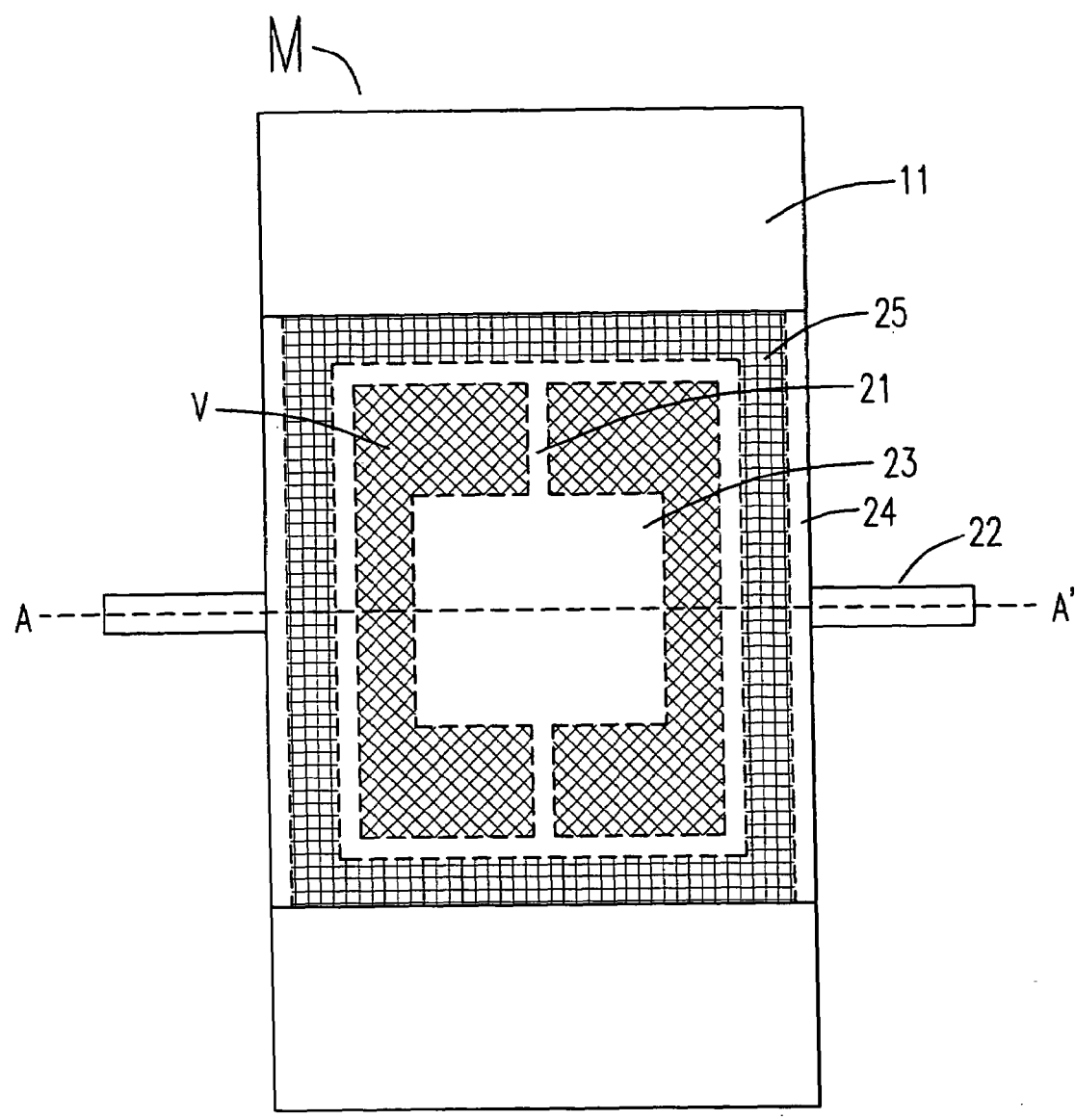
FIG. 1 is a perspective view showing the two-axis mirror according to the preferred embodiment of the present invention.

Please refer to FIG. 1, which is a perspective view showing the two-axis mirror according to a preferred embodiment of the present invention. As shown in FIG. 1, the two-axis mirror M includes the first silicon substrate 11, the first shaft 21, the second shaft 22, the actuating portion 23, the circular portion 24 and the vacuum concavity V.

Figure 2:
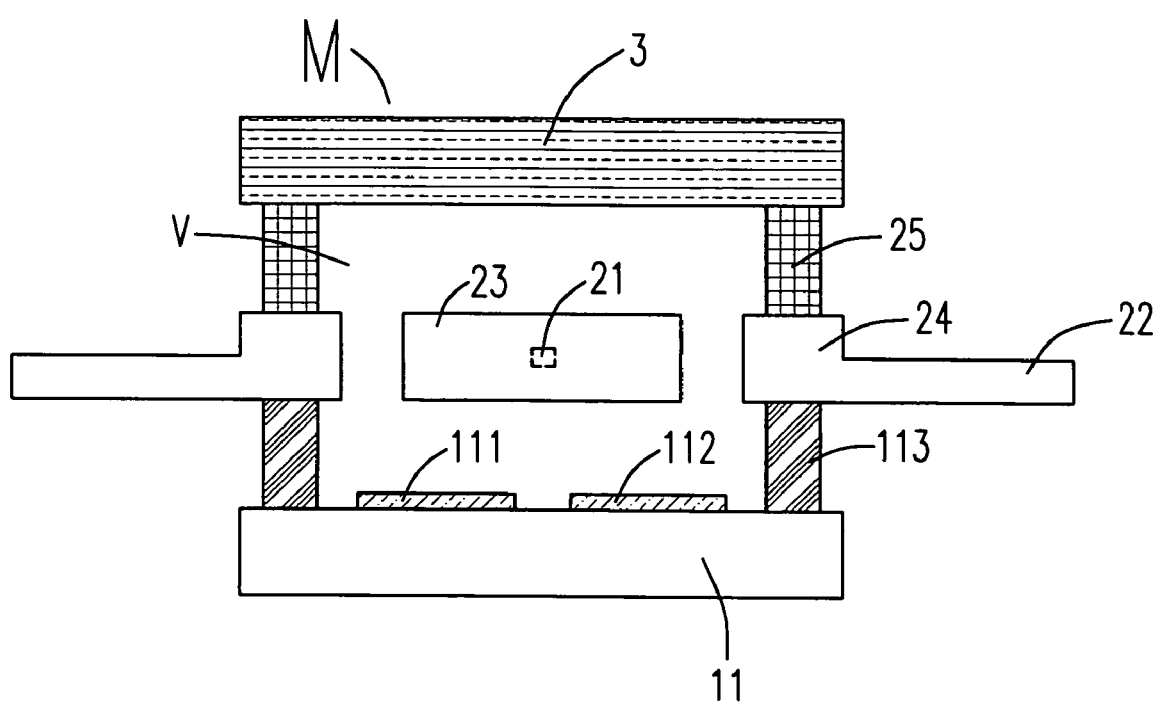
FIG. 2 is the cross-sectional view of the two-axis mirror along the line A–A' in FIG. 1.

Please refer to FIG. 2, which is the cross-sectional view of the two-axis mirror along the line A–A' in FIG. 1. As shown in the cross-sectional view in FIG. 2, the two-axis mirror M includes the first silicon substrate 11, the first connecting layer 113, the positive electrodes 111, the negative electrodes 112, the actuating portion 23, the second shaft 22, the second connecting layer 25, the circular portion 24, the transparent cover 3 and the vacuum concavity V.

Figure 3A:
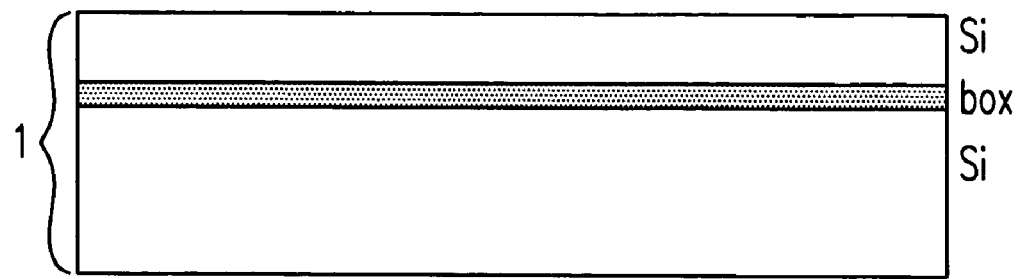
FIGS. 3(A)–3(C) are the flow charts showing the manufacturing process for the base structure of the two-axis mirror according to the preferred embodiment of the present invention.
Figure 3B:
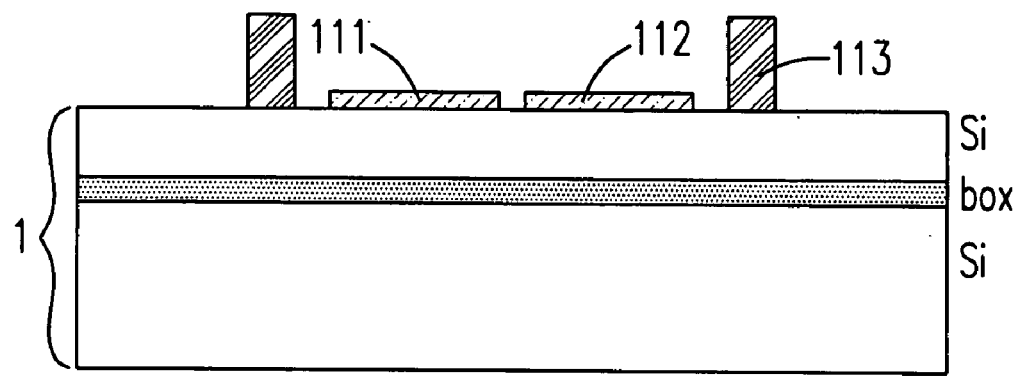
Figure 3C:
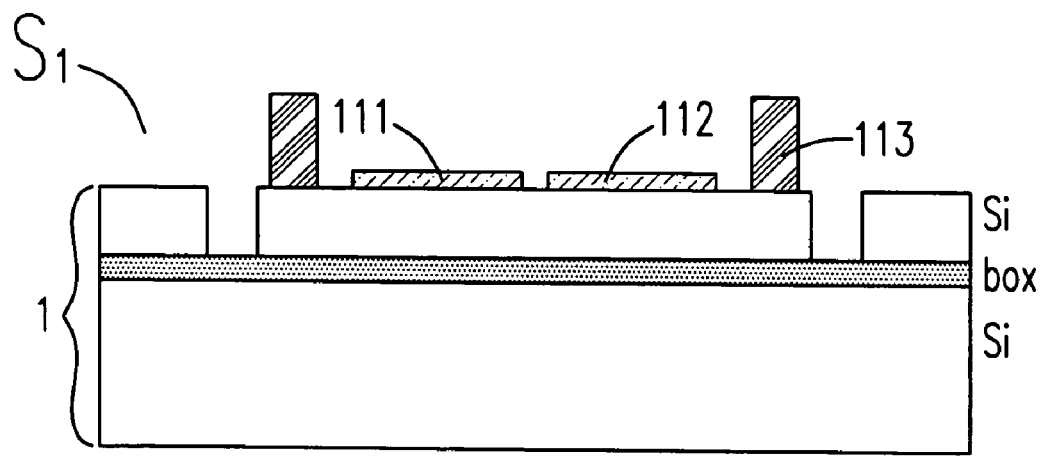

Please refer to FIGS. 2 and 3(A)–3(C), wherein FIGS. 3(A)–3(C) show the flow charts of the manufacturing process for the base structure of the two-axis mirror according to the preferred embodiment of the present invention. As shown in FIGS. 3(A)–3(B), after the silicon substrate 1 is provided (a silicon on insulator (SOI) chip is provided in this embodiment), the positive electrodes 111, the negative electrodes 112 and the first connecting layer 113 are formed on the silicon substrate 1 by the common techniques used in the relevant fields. In general, the first connecting layer 113 is made of a metal, a polymer or an electromagnetic inductive material. Then, a dry etching is performed on the silicon substrate 1 to form the base structure $S_1$ as shown in FIG. 3(C).

Figure 4A:
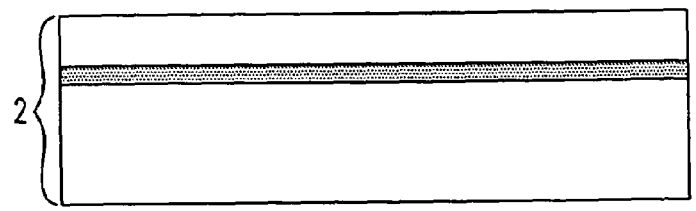
FIGS. 4(A)–(E) are the flow charts showing the manufacturing process for the top structure of the two-axis mirror according to the preferred embodiment of the present invention.
Figure 4B:
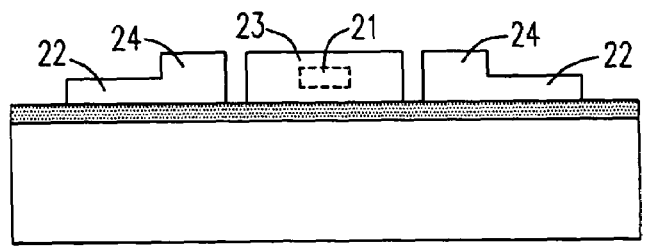
Figure 4C:
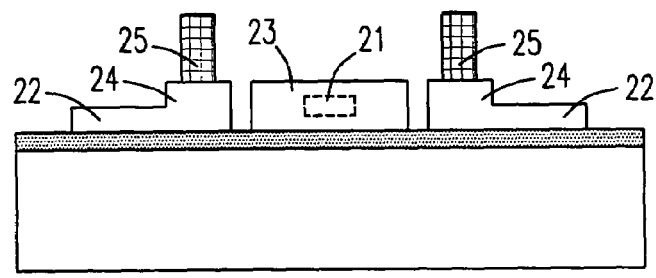
Figure 4D:
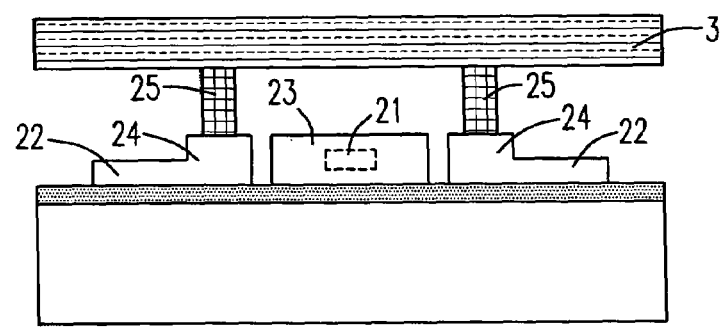
Figure 4E:
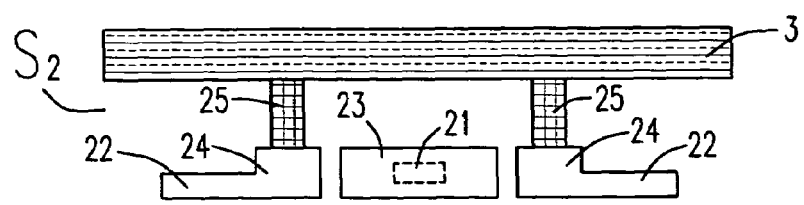

Please refer to FIGS. 1, 2 and 4(A)–4(E). FIGS. 4(A)–4(E) show the flow charts of the manufacturing process for the top structure of the two-axis mirror according to the preferred embodiment of the present invention. As shown in FIGS. 4(A)–4(B), the first shaft 21, the second shaft 22, the actuating portion 23 and the circular portion 24 are formed on the second silicon substrate 2, a SOI chip in this embodiment, by a dry etching. Since FIGS. 4(A)–4(B) are the cross-sectional schematic drawings and the first shaft 21 is covered with the actuating portion 23, the location of the first shaft 21 is represented by the dot-line. Then, please refer to FIG. 4(C), the second connecting layer 25 is formed on the circular portion 24 by the common techniques used in the relevant field. After that, the transparent cover 3 is formed on the second connecting layer 25, as shown in FIG. 4(C). In general, the transparent cover 3 is one of an insulating glass substrate and a quartz substrate. Next, the second silicon substrate 2 is etched from its bottom surface and the top structure $S_2$ would be formed accordingly as shown in FIG. 4(E).

Figure 5A:
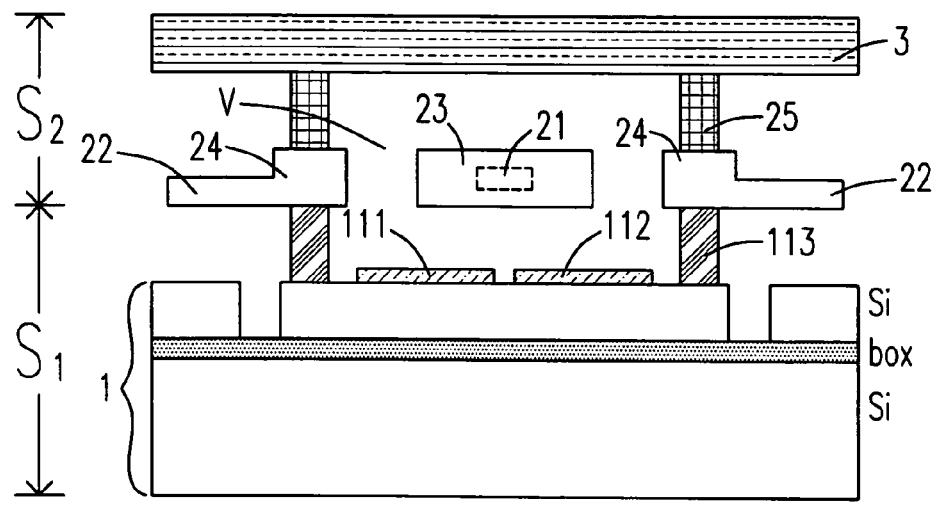
FIGS. 5(A)–5(C) are schematic views showing the two-axis mirror according to the preferred embodiment of the present invention.
Figure 5B:
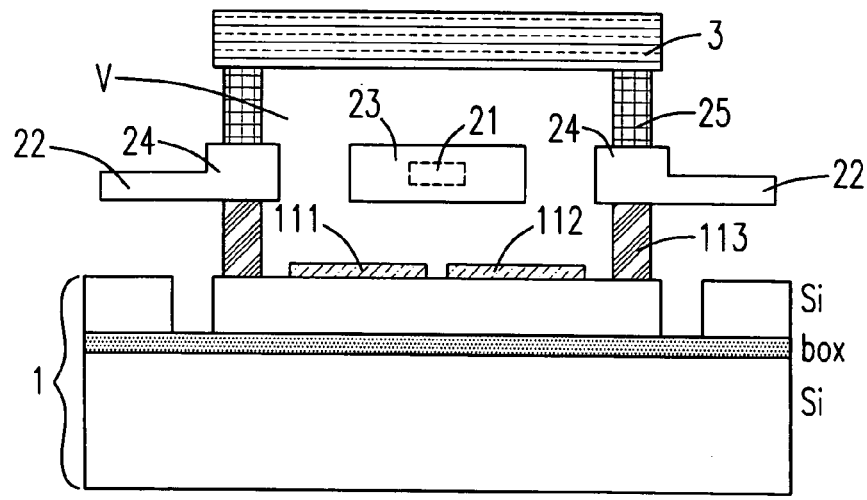
Figure 5C:
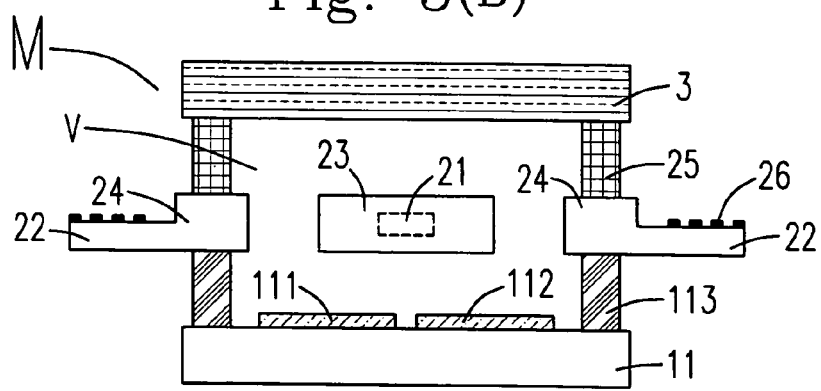

Please refer to FIGS. 2 to 5(C), wherein FIGS. 5(A)–5(C) are the schematic views showing the two-axis mirror according to the preferred embodiment of the present invention. As shown in FIG. 5(A), the vacuum concavity V is formed by connecting the base structure $S_1$ shown in FIG. 3(C) to the top structure $S_2$ shown in FIG. 4(E) in a vacuum situation. Next, the transparent cover 3 is shaped as shown in FIG. 5(B). The silicon substrate 1 is etched from its bottom surface and the first silicon substrate 11 is formed accordingly, as shown in FIG. 5(C). Furthermore, if necessary, the conducting wire 26 is located on the second shaft 22 so as to control the movement of the second shaft 22 by the magnetic effect resulted from the current applied in the conducting wire 26. In addition, the movement of the first shaft 21 is controlled by the static force resulted from the positive electrodes 111 and the negative electrodes 112.

As shown in FIGS. 1 to 5(C), the first shaft 21 of the two-axis mirror M does be completely located in the vacuum concavity V formed by the first silicon substrate 11, the first connecting layer 113, the second connecting layer 25, the transparent cover 3 and the circular portion 24, and the second shaft 22 is located in the atmosphere.

In view of the aforesaid, a two-axis mirror with two shafts respectively located in the situations with the different quality factors does be achieved in the present invention, wherein one the of the two shafts is located in the situation with a high quality factor (in the vacuum), and the other shaft is located in the situation with a low quality factor (such as in the atmosphere).

While the invention has been described in terms of what is presently considered to be the most practical and preferred embodiment, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A two-axis device, comprising:
   a first substrate comprising a plurality of electrodes;
   a first connecting layer located on said first substrate;
   an actuating layer connected to said first substrate via said first connecting layer, comprising a circular portion, an actuating portion, a first shaft and a second shaft;
   a second connecting layer connected to said actuating layer; and
   a cover connected to said actuating layer via said second connecting layer, wherein a vacuum concavity is formed by said first substrate, said first connecting layer, said actuating layer, said second connecting layer and said cover, said actuating portion and said first shaft are located in said vacuum concavity, and said second shaft extends outside of said vacuum concavity.

2. The two-axis device as claimed in claim 1, wherein said plurality of electrodes comprise a positive electrode and a negative electrode.

3. The two-axis device as claimed in claim 1, wherein said plurality of electrodes are ones of metal electrodes and polysilicon electrodes.

4. The two-axis device as claimed in claim 1, wherein said first substrate and said cover are made of an insulating material.

5. The two-axis device as claimed in claim 1, wherein said actuating layer is made of one of a silicon and a combination thereof.

6. The two-axis device as claimed in claim 1, wherein said cover is a transparent cover.

7. The two-axis device as claimed in claim 1, wherein said first connecting layer comprises one of a first metal layer and a first electromagnetic induction layer.

8. The two-axis device as claimed in claim 1, wherein said second connecting layer comprises one of a second metal layer and a second electromagnetic induction layer.

9. A two-axis device, comprising: a vacuum concavity formed by plural substrates, a supporting portion, and at least a connecting layer; and an actuating portion located in said vacuum concavity, comprising said supporting portion, an actuating component, a first shaft and a second shaft, wherein said first shaft and said second shaft are axes of said actuating component, said first shaft is contained in said vacuum concavity, and said second shaft extends outside of said vacuum concavity.

10. The two-axis device as claimed in claim 9, wherein one of said plural substrates comprises plural electrodes.

11. The two-axis device as claimed in claim 9, wherein said plural substrates are insulating substrates.

12. The two-axis device as claimed in claim 9, wherein said connecting layer comprises one of a metal layer and an electromagnetic induction layer.

13. A resonance device, comprising: an actuating component; and a two-axis component, wherein said two-axis component comprises a vacuum concavity formed by plural substrates and at least a connecting layer and a two-axis actuating component located in said vacuum concavity and comprising a first shaft and a second shaft, and said first shaft is contained in said vacuum concavity, and said second shaft extends outside of said vacuum concavity.

14. A method for manufacturing a two-axis device, wherein said two-axis device has a first shaft and a second shaft, comprising steps of: a) providing a first substrate and a second substrate; b) forming plural electrodes on said first substrate; c) forming a first connecting layer on said first substrate; d) etching said first substrate to form a first base; e) patterning said second substrate to form a second base and an actuating structure comprising said two-axis device; f) forming a second connecting layer on said second substrate; g) connecting a cover onto said second connecting layer for covering said second substrate; h) removing said second base; i) connecting said first connecting layer to said actuating structure in a vacuum; wherein said first shaft is contained in a vacuum concavity and said second shaft extends outside of said vacuum concavity, and j) removing said first base.

15. The method as claimed in claim 14, wherein said first substrate and said second substrate are silicon on insulator (SOI) chips.

16. The method as claimed in claim 14, wherein said plural electrodes are ones of metal electrodes and polysilicon electrodes.

17. The method as claimed in claim 14, wherein said steps d), e), h) and j) are performed by etching.

18. The method as claimed in claim 14, wherein said cover is made of a transparent insulating substrate.

19. A method for manufacturing a microsystem device, comprising steps of: a) providing plural substrates; b) etching said plural substrates to form an upper substrate, a lower substrate, and a two-axis device comprising a first shaft and a second shaft; and c) connecting said plural substrates to said two-axis device to form said microsystem device, wherein said microsystem device comprises a vacuum concavity, said two-axis device and said first shaft are located in said vacuum concavity, and said second shaft extends outside of said vacuum concavity.

20. The method as claimed in claim 19, wherein said plural substrates comprise a silicon on insulator (SOI) chip.

21. The method as claimed in claim 19, wherein said plural substrates comprise a transparent substrate.

22. The method as claimed in claim 19, wherein said step c) is performed via a connecting material.

23. The method as claimed in claim 22, wherein said connecting material is one of a metal and a polymer.

* * * * *